Feb. 6, 1940. H. L. WAGNER 2,189,234
CINDER TRAP
Filed Jan. 3, 1938 4 Sheets-Sheet 1
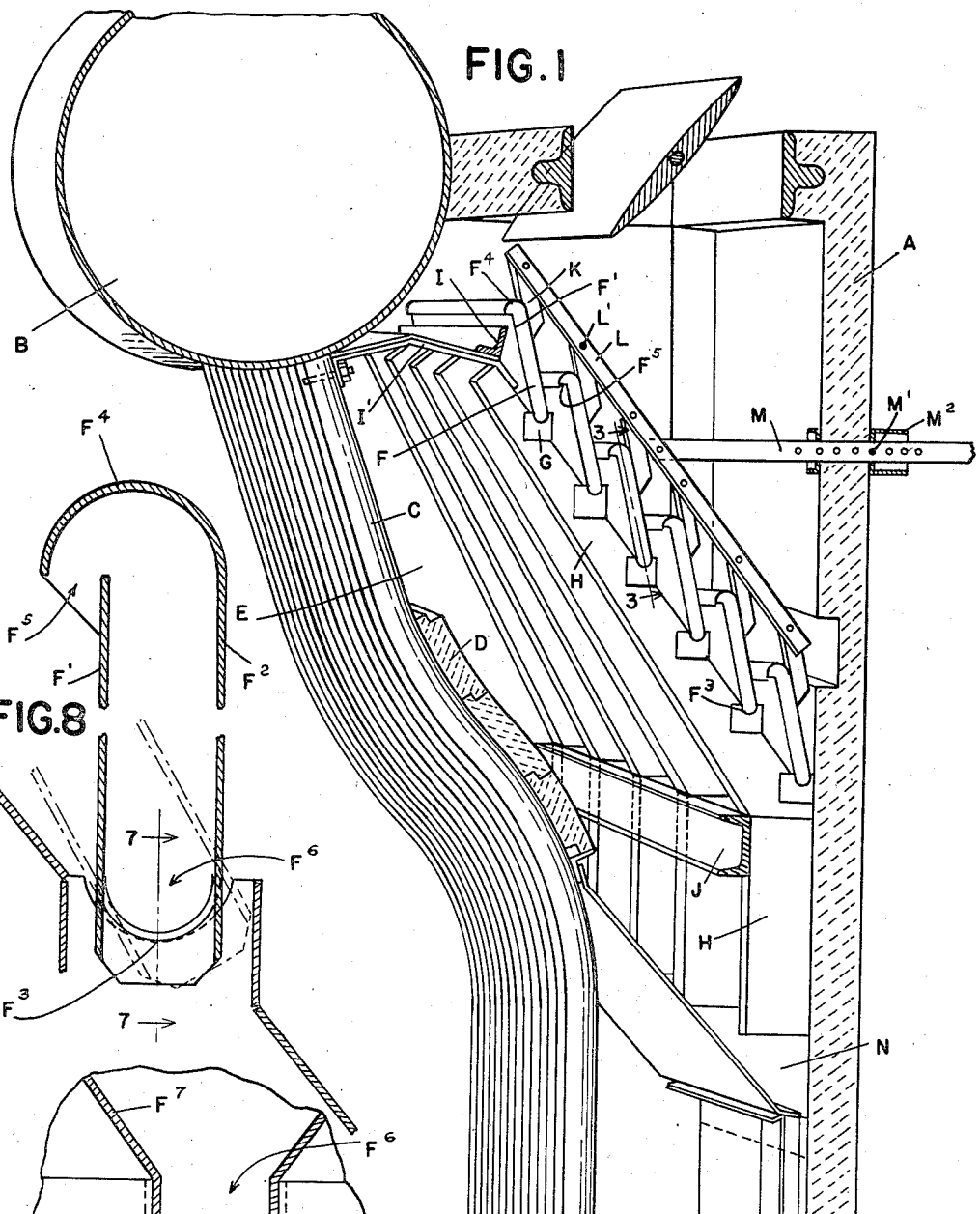
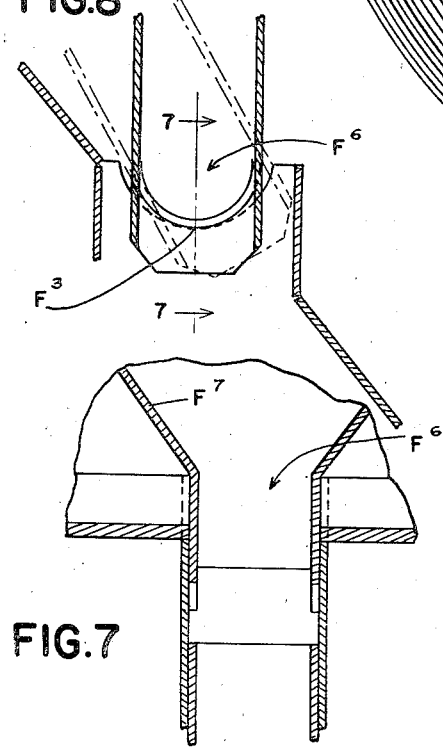
INVENTOR
HERBERT L. WAGNER
BY
Whittemore Hulbert & Belknap
ATTORNEYS Feb. 6, 1940.   H. L. WAGNER   2,189,234
CINDER TRAP
Filed Jan. 3, 1938   4 Sheets-Sheet 2
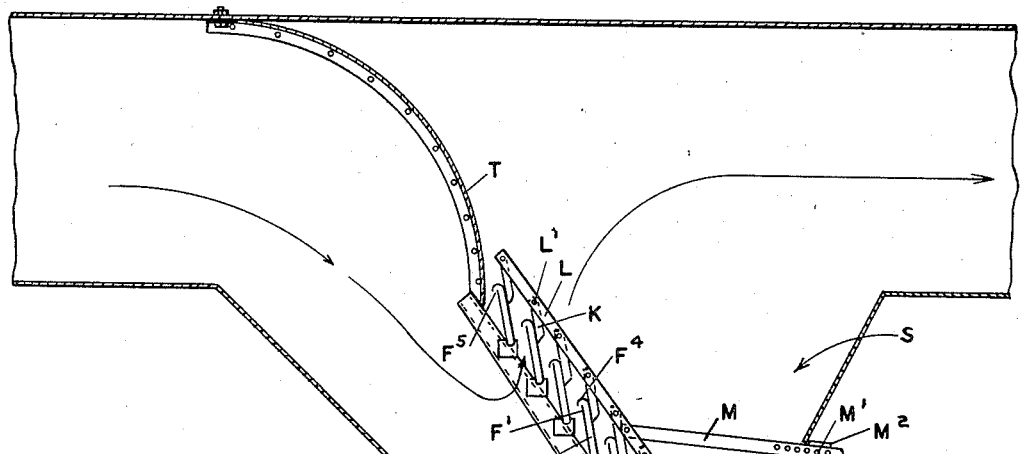
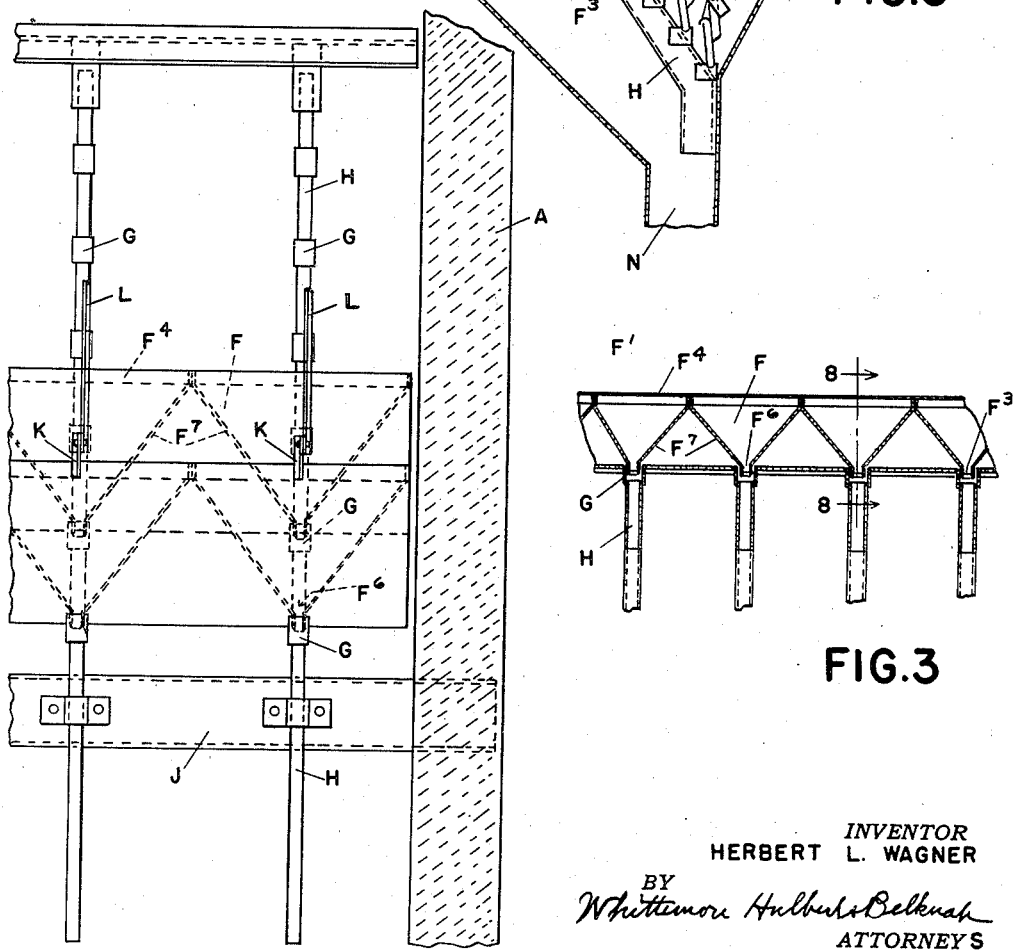
INVENTOR
HERBERT L. WAGNER
BY
Whittemore Hulbert & Belknap
ATTORNEYS Feb. 6, 1940.   H. L. WAGNER   2,189,234
CINDER TRAP
Filed Jan. 3, 1938   4 Sheets-Sheet 3

INVENTOR
HERBERT L. WAGNER
ATTORNEYS

Patented Feb. 6, 1940

2,189,234

UNITED STATES PATENT OFFICE 2,189,234

CINDER TRAP

Herbert L. Wagner, Detroit, Mich., assignor to Detroit Stoker Company, Monroe, Mich., a corporation of Michigan Application January 3, 1938, Serial No. 183,172

10 Claims. (Cl. 183—75)

The invention relates to cinder and ash removers of the type shown in Letters Patent No. 2,065,554, issued December 29, 1936. With constructions of this type the cinders and other solid particles carried in suspension by the combustion gases are removed by impinging against a series of spaced baffles arranged in the path of the current. The baffles are arranged at a predetermined angle to the initial direction of the current, this being so selected as to permit the deflection of the gases while checking the momentum of the solid particles. As a consequence, the solid particles will drop out of the current and will fall into a receiver. However, the effectiveness of such a separator depends upon various conditions, such as the velocity of the current, the size of the particles, and the angle at which the baffles are arranged. Also, the particles after impinging against the baffles must still pass through moving gases and may again be picked up.

It is the object of the present invention to obtain a construction in which the cinders and other solid particles are not only arrested by the baffles, but are completely separated from the gaseous current. It is a further object to obtain a construction in which the baffles may be angularly adjusted, and still further one in which the cross sectional area through which the gases pass at the point of separation, may be increased or diminished. With these and other objects in view the invention consists in the construction as hereinafter set forth.

In the drawings:

Figure 1 is a sectional perspective view through a portion of a furnace provided with my improved cinder trap;

Figure 2 is a side elevation thereof;

Figure 3 is a section on line 3—3 of Figure 1, through one of the hollow baffles;

Figure 6 shows a trap as located in the breeching for a furnace;

Figure 7 is an enlarged view of a portion of Figure 3 on line 7—7 of Figure 8;

Figure 8 is a cross section through one of the baffles on line 8—8 of Figure 3.

Figure 4:
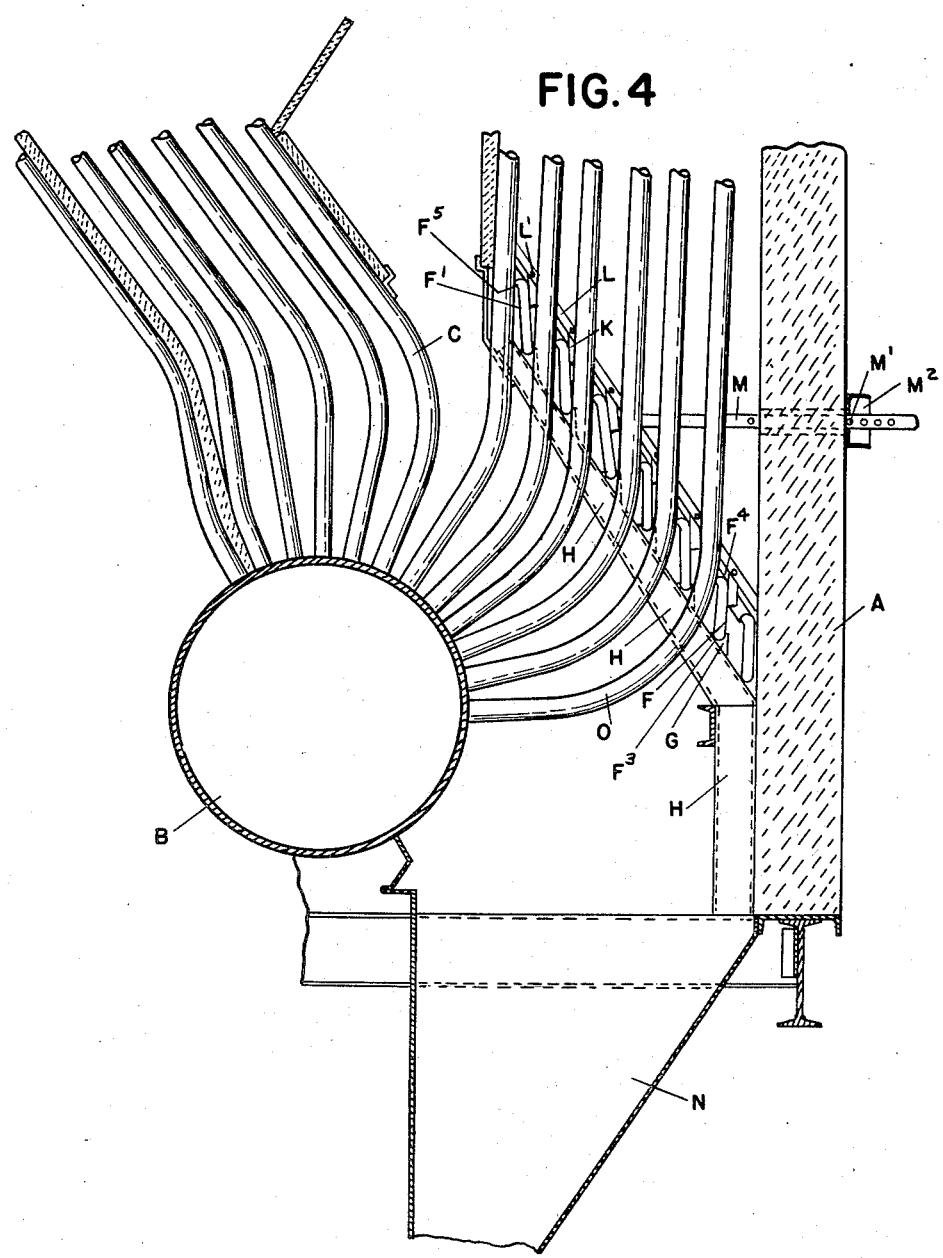
Figures 4 and 5 illustrate the cinder trap applied to different types of boiler furnaces and in different locations.

With the type of separator shown in my former patent above referred to, a series of baffle plates is arranged across a passage for the cinder laden gases with the individual plates at an angle substantially perpendicular to the original direction of flow. Thus, the solid particles impinging against such plates will lose their momentum and consequently will drop downward, while the gases pass upward through the spaces between the plates. With the present construction, I use substantially the same arrangement of a series of baffles, but instead of dropping the cinders therefrom, they are directed into a chamber within the baffle. This chamber is connected to a downwardly extending conduit through which the cinders are conveyed to a receptacle for receiving the same and without again coming in contact with the gaseous current. As shown in Figures 1 and 2, A is the outer wall of a furnace; B a boiler drum; C tubes connected to the drum, and D a baffle adjacent to the tubes leaving an open area E between tubes for the passage of the gaseous products of combustion. My improved cinder trap is located in the space between the drum B and the outer wall A and extends across the path of the cinder laden gases. This trap comprises a series of hollow baffles F pivotally supported at their lower ends upon hollow bearings G connected with inclined conduits H. The conduits H are supported at their upper ends by a bracket frame I preferably clipped to the tubes C and having a reinforcing angle bar I' at its outer end. The lower ends of the conduits H extend into contact with the wall A and then vertically downward, being connected to and supported by a transverse beam J. Thus, the conduits H together with the bearings G form the support for the hollow baffles F.

Each of the baffles F is preferably formed of sheet metal having spaced parallel front and rear walls F', F² connected to each other by a rounded bend F³ at the lower end. At the upper end the rear wall F² is return bent at F⁴ to overlap the front wall F' and to leave an open slot F⁵ communicating with the chamber within the baffle. At points registering with each of the hollow bearings G the portion F³ is slit and bent downward to form a spout F⁶ for entering said bearing. There is also arranged within the chamber between the front and rear walls F', F², a series of inclined partitions F⁷, which together form hoppers extending from the upper end of the chamber to each of the spouts. Thus, any material entering through the slot F⁵ into the chamber within the baffle will be directed downward to the spouts F⁶ and from the latter through the hollow bearings G into the conduits H.

Each of the bearings G is preferably formed of a U-shaped member which embraces the walls of the conduit H and is attached thereto preferably by welding. The conduit H has its upper wall cut away at the point embraced by each bearing G, so as to be in open communication therewith. At its upper end, each member G has a semi-circular bearing portion for engaging the return bend F³ of the hollow baffle on opposite sides of the spout F⁶. This permits of rocking the baffles on the bearings G to change their angular relation to the conduit H, and I have also provided a connecting mechanism for simultaneously and correspondingly adjusting all of the baffles. This comprises lugs K projecting upward from the rear side of each baffle and a connecting rod L pivotally attached at L' to each lug K. At one point in the length of the rod L there is attached thereto an actuating rod M which passes outward through a slot in the wall A. This permits of adjusting the baffles outside the furnace so as to arrange the same at any desired angle and to thereby increase or diminish the open space between said baffles through which the gaseous current passes.

With the construction as thus far described, it will be evident that the cinder laden gases passing between the tubes C through the open area E will be directed against the baffles F which will deflect the current in an upward direction. The momentum of the cinders and other solid particles impinging against the front wall F' of each baffle F will cause them to pass upward close to this wall and into the slot F⁵. The return bend F⁴ acts as a skimmer for separating the solid particles from the gaseous current and directing the former into the upper ends of the hoppers from which they will pass through the spouts into the conduits H. The lower ends of these conduits discharge the material into a hopper-shaped receptacle N forming a continuation of the baffle D and from this receptacle the cinders may pass through conduits, not shown, to be eventually returned to the furnace.

As above stated, the angle of the baffles with reference to the conduit H may be changed through the medium of the rod M and connecting mechanism. This will enable the operator either to restrict the open area between baffles so as to increase the velocity of the current passing therethrough, or to change the angle of the baffles with reference to the initial direction of the cinder laden gases, so as to obtain the best results in cinder elimination. After adjustment is made, the parts may be held in this position by a locking pin passing through any one of a number of apertures M' and a registering aperture in a bracket M².

Figure 5:
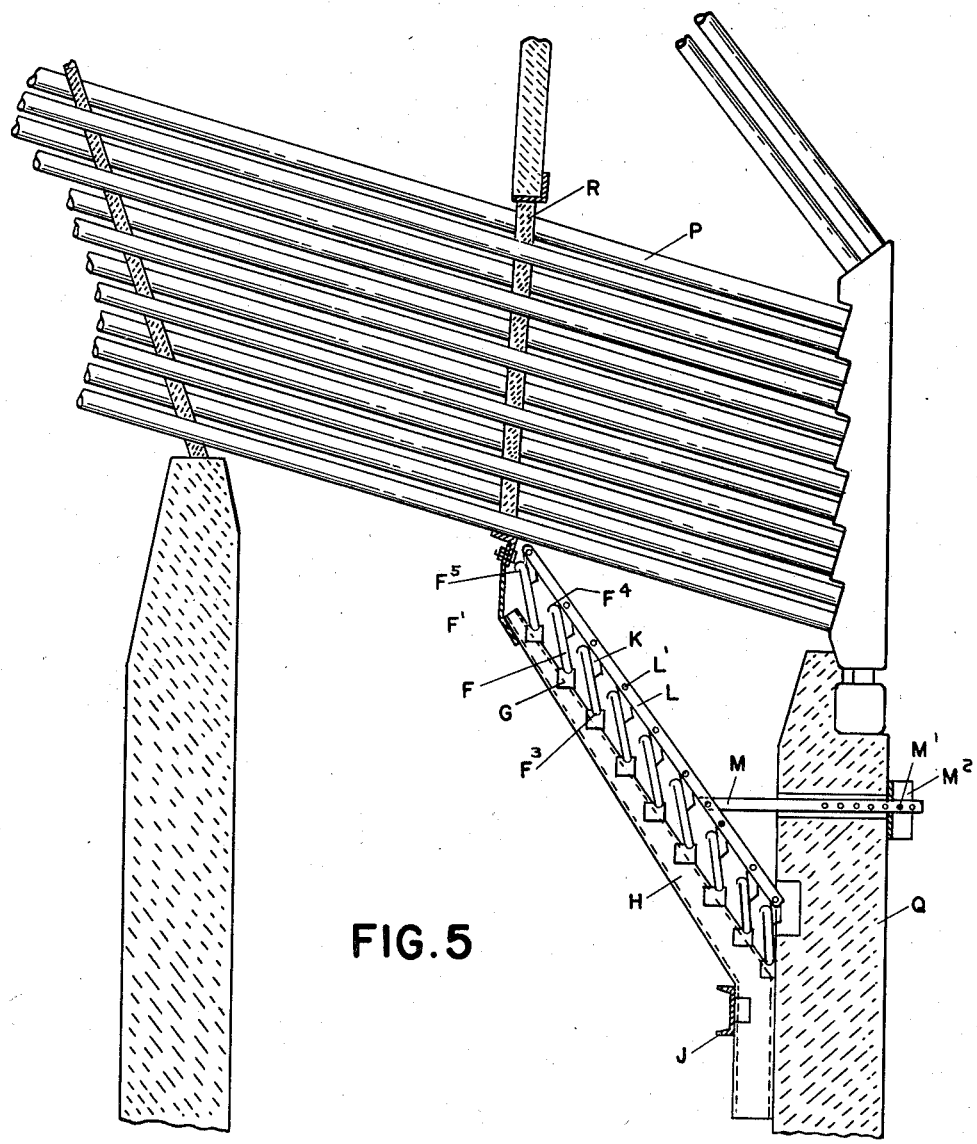

In Figures 4 and 5 the same construction of cinder trap is shown, but arranged in different positions relative to the furnace and boiler. In Figure 4 the trap is placed near the base of the furnace to extend across a series of curved boiler tubes O, the hollow baffles being arranged between adjacent rows of tubes. In Figure 5 a cinder trap is arranged beneath an inclined series of tubes P and adjacent to a supporting wall Q, its upper end being in alignment with a baffle R extending transversely across the tubes. Thus, the cinder laden gaseous currents will be compelled to first pass downward between the tubes, then through the trap and upward through the tubes on the opposite side of the baffle R. In Figure 6 the same construction of cinder trap is shown as placed in a well S connected with the breeching T for boiler furnaces to separate the cinders from the gases passing therethrough. In all of these various arrangements the functioning of the trap is the same.

What I claim as my invention is:

1. A cinder trap for removing from gaseous currents particles carried in suspension therein, comprising a group of hollow baffles arranged transversely across and at an oblique angle to the path of the current, a skimmer on each baffle for collecting the suspended particles impinging thereon and directing the same into the interior of the baffle while permitting the gases to continue over the exterior, and a conduit for supporting said baffles connected to the interior of each through which the accumulated particles are discharged.

2. A cinder trap for removing from gaseous currents particles carried in suspension therein, comprising a hollow baffle extending at an oblique angle across the path of the current, a skimmer for directing the suspended particles impinging thereon into the interior of the baffle while permitting the gases to continue over the exterior, a pivotal support for said baffle permitting angular adjustment of the same, and a conduit passing through said pivotal support through which the collected particles may be discharged.

3. A cinder trap for removing from gaseous currents particles carried in suspension therein, comprising a hollow baffle extending at an oblique angle across the path of the current, said baffle having a return bend from the upper end of its rear side overlapping the forward side and forming a skimmer for directing solid particles impinging against said forward side into the interior while permitting the gases to continue over the exterior.

4. A cinder trap for removing from gaseous currents particles carried in suspension therein, comprising a hollow baffle extending at an oblique angle across the path of the current, said baffle having a return bend at the upper end of its rear side overlapping its forward side and forming a skimmer for directing solid particles impinging against said forward side into the interior while permitting the gases to continue over the exterior, means within said hollow baffle for directing the collected particles to a point of discharge at the lower end thereof, and a conduit connected to said point of discharge.

5. A cinder trap for removing from gaseous currents particles carried in suspension therein, comprising a hollow baffle extending transversely across at an oblique angle to the path of the current, said baffle having a return bend at the upper end of its rear side overlapping its forward side and forming a skimmer for directing suspended particles impinging against said forward side into the interior while permitting the gases to continue over the exterior, a series of deflectors within the interior of said hollow baffle for directing the collected particles to spaced points in the lower end thereof, and conduits connected with the hollow baffle at said spaced points through which the collected particles are discharged.

6. A cinder trap for removing from gaseous currents particles carried in suspension therein, comprising a group of hollow baffles extending transversely across at an oblique angle to the path of the current, each baffle having a return bend at the upper end of its rear side overlapping the forward side and constituting a skimmer for directing particles impinging against said baffle into the interior thereof while permitting the gases to continue over the exterior, deflectors within each baffle for directing the collected particles to spaced points at the lower end thereof, and conduits for supporting said baffles connected to the interior thereof at said spaced points through which conduits the collected particles are discharged.

7. A cinder trap for removing from gaseous currents particles carried in suspension therein, comprising a group of hollow baffles extending transversely across at an oblique angle to the path of the current, each baffle having a return bend at the upper end of its rear side overlapping the forward side and constituting a skimmer for directing particles impinging against said baffle into the interior thereof while permitting the gases to continue over the exterior, deflectors within each baffle for directing the collected particles to spaced points at the lower end thereof, conduits on which said hollow baffles are pivotally supported and connected therewith at said spaced points, and means for adjusting said baffles on said pivotal supports to change the angular position thereof and the cross sectional area of the space between adjacent baffles.

8. A cinder trap for removing from gaseous currents particles carried in suspension therein, comprising a plurality of baffles spaced across the gas passageway, each baffle being hollow and having a return bend from the upper end of its rear side overlapping the forward side and forming a skimmer for directing the particles impinging against said forward side into the interior, conduits on which said baffles are pivotally supported and which communicate therewith to receive the skimmed particles therefrom, and means for tilting said baffles on their pivotal supports to vary the cross section of the gas passageway.

9. A cinder trap for removing from gaseous currents solid particles carried in suspension therein, comprising a hollow baffle having its forward side arranged to deflect the current upwardly thereacross, a rear side provided with a return bend at its upper end overlapping said forward side and forming a skimmer for directing impinging solid particles into the interior and around said bend to drop to the bottom of said hollow baffle, and a discharge conduit communicating with the bottom of said baffle for receiving said particles.

10. A cinder trap for removing from gaseous currents solid particles carried in suspension therein comprising a plurality of baffles spaced across the gas passageway, each baffle being hollow and arranged to have its forward side deflect the current upward thereacross, a return bend from the upper end of its rear side overlapping the forward side and forming a skimmer for directing the impinging solid particles into the interior and around said bend to drop to the bottom of said hollow baffle, and a conduit communicating with the bottom of each baffle through which the particles are discharged.

HERBERT L. WAGNER.